(12) United States Patent
Souchon et al.

(10) Patent No.: US 11,455,635 B2
(45) Date of Patent: Sep. 27, 2022

(54) AUTONOMOUS ENROLLMENT SYSTEM AND METHOD FOR HOLDER OF BIOMETRIC DEVICE

(71) Applicant: THALES DIS FRANCE SAS, Meudon (FR)

(72) Inventors: Pierre Souchon, Gémenos (FR); Laurent Leloup, Gémenos (FR); Frédéric Martinez, Gémenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/055,438

(22) PCT Filed: May 13, 2019

(86) PCT No.: PCT/EP2019/062155
§ 371 (c)(1),
(2) Date: Nov. 13, 2020

(87) PCT Pub. No.: WO2019/219575
PCT Pub. Date: Nov. 21, 2019

(65) Prior Publication Data
US 2021/0192529 A1  Jun. 24, 2021

(30) Foreign Application Priority Data
May 15, 2018 (EP) .................................. 18305594

(51) Int. Cl.
*G06Q 20/40* (2012.01)
*G06F 21/32* (2013.01)
(Continued)

(52) U.S. Cl.
CPC ....... *G06Q 20/40145* (2013.01); *G06F 21/32* (2013.01); *G06Q 20/341* (2013.01);
(Continued)

(58) Field of Classification Search
CPC . G06Q 20/40145; G06Q 20/352; G06F 21/32
See application file for complete search history.

(56) References Cited

U.S. PATENT DOCUMENTS 10,417,626 B1 * 9/2019 Locke .................. G07F 7/0893
11,004,074 B1 * 5/2021 Hiccox ................ G06K 19/073
(Continued)

FOREIGN PATENT DOCUMENTS

| JP | 2006501583 A | 1/2006 |
| WO | WO2004025545 A2 | 3/2004 |
| WO | 2017191211 A1 | 11/2017 |

OTHER PUBLICATIONS

Swing-Pay: A Digital Card Module using NFC and Biometric Authentication for Peer-to-Peer Payment (Year: 2017).*
(Continued)

*Primary Examiner* — Calvin L Hewitt, II
*Assistant Examiner* — Amanulla Abdullaev
(74) *Attorney, Agent, or Firm* — Marc Boillot; Thales Dis CPL USA, Inc (57) ABSTRACT

A method for enrolling a holder of a biometric transaction device includes the following step: storing at least one biometric pattern in the device. The method further includes the following steps: a) providing the holder with a portable, mobile power connector, configured to trigger the storing; b) and/or activating the biometric pattern, the activation being carried out in response to or in association with a successful authentication of the holder. A corresponding system is also enclosed.

5 Claims, 6 Drawing Sheets

(51) Int. Cl.
*G06Q 20/34* (2012.01)
*G06V 40/50* (2022.01)

(52) U.S. Cl.
CPC ....... *G06Q 20/401* (2013.01); *G06Q 20/4012* (2013.01); *G06V 40/50* (2022.01)

(56) References Cited

U.S. PATENT DOCUMENTS

| | | | |
|---|---|---|---|
| 2009/0145972 A1* | 6/2009 | Evans | G06Q 20/40145 235/492 |
| 2014/0052630 A1 | 2/2014 | Bona et al. | |
| 2015/0127553 A1* | 5/2015 | Sundaram | G06Q 30/0233 705/72 |
| 2016/0087962 A1 | 3/2016 | Cao | |
| 2017/0264599 A1* | 9/2017 | O'Regan | H04W 12/068 |
| 2017/0300680 A1 | 10/2017 | Wendling | |
| 2019/0095655 A1* | 3/2019 | Krawczewicz | H04L 9/3234 |
| 2020/0034830 A1* | 1/2020 | Ortiz | G06Q 20/3278 |
| 2021/0049612 A1* | 2/2021 | Chen | G06Q 20/3227 |

OTHER PUBLICATIONS

Mobile Biometrics Information and Solutions Directory: Find Biometrics (Year: 2016).*

International Search Report (PCT/ISA/210) dated Jun. 12, 2019, by the European Patent Office as the International Searching Authority for International Application No. PCT/EP20/19/062155.

Written Opinion (PCT/ISA/237) dated Jun. 12, 2019, by the European Patent Office as the International Searching Authority for International Application No. PCT/EP20/19/062155.

Office Action mailed for co-pending Application in Japan N°2020-564210, dated Dec. 22, 2021, together with corresponding English translation (11 pages).

* cited by examiner

AUTONOMOUS ENROLLMENT SYSTEM AND METHOD FOR HOLDER OF BIOMETRIC DEVICE

FIELD OF THE INVENTION

The invention relates to a method and system of autonomous enrolment for biometric device holders.

The invention relates to biometric devices including, in particular, smart cards equipped with fingerprint sensors. The chips carried in such cards can be configured with an ISO 7816 contact communication interface to communicate with a reader with electrical contacts and/or an antenna to communicate with readers in contactless mode. In addition, they may have at least one other interface to communicate with other internal peripheral components such as sensors (fingerprint sensor, display, mass storage, real-time clock).

The invention also relates to electronic products or devices that use biometric security elements, for example, USB keys, watches, bracelets, wearables.

PRIOR ART

Biometric sensor cards represent a new generation of payment cards, generating high expectations from users (cardholders) and interest from banks.

This interest is due to the convenience of such cards (no need to memorise a PIN code) and the security they provide thanks to the fingerprint sensor integrated in the card and used to authenticate the cardholder/card user.

However, one of the critical stages in the user experience is the registration/enrolment process, in which a reference template for the cardholder's fingerprints is collected and stored in the card to permit it to be personalised.

The present applicant currently offers a biometric tablet comprising a fingerprint reader and a smart card reader, for full and final enrolment at bank branches. However, this solution is not sufficient insofar as there is a clearly expressed need from the majority of banks for a solution permitting their customers to do their own enrolment of their fingerprints, on account of the reduction in the number of bank branches or in the number of people attending such branches.

We also know of a competing method of enrolment using a smartphone and a battery-powered biometric card. However, this solution is highly restricted as there needs to be a battery in the card and this adds the disadvantage of battery life.

We also know (since it has been proposed by the applicant) of a method of enrolment using a card reader that is connected (via USB or Bluetooth) to a computer processing unit (computer, smartphone or PDA) to authenticate the user. This requires a specific software application to be installed in the computer and/or a pairing/coupling between the biometric device and the computer (or phone) and there is an obligation for unfamiliar instructions from the above-mentioned application to be followed to permit enrolment with the processing unit and verification of the identity of the device's owner (for example, via a secret code).

We also know of proposals for enrolment at the bank's local branch using a dedicated tablet (or kiosk or other solution, etc.) but this requires users to travel to a predetermined location.

We also know of a "sleeve" device that can assist in registering a person's fingerprints. Essentially, the device is in the form of a card holder with a built-in battery. A biometric card is inserted into the sleeve and the power is transmitted to the card.

The first time the sleeve is used, the person places their finger on the fingerprint reader three times and a registration is done. A fingerprint is stored as a template of encrypted numbers rather than as a physical image of a fingerprint, and the sleeve does not in any way connect to the internet.

Thus, a means is proposed to permit people to easily and conveniently register their fingerprints on the biometric card from the comfort of their own home.

However, there is no clear and specific indication of how such a device might work in detail. There is no indication of whether this card holder device is specifically configured or of how it would be configured.

This device seems to simply supply the card with power, and this may pose some problems, notably in relation to security.

Technical Problem

The invention is intended to resolve the above-mentioned disadvantages.

The invention seeks to offer a solution permitting a bank card holder to enroll more easily and/or with the least possible constraints or obligations (i.e. providing the holder with the best user experience possible).

The invention seeks to facilitate a transparent or quasi-transparent enrolment process for users, preferably with the least possible loss of time and with various possible levels of security.

SUMMARY OF THE INVENTION

According to a first aspect, the invention resolves these problems in a preferred embodiment by allowing the enrolment process to be initiated anywhere, preferably autonomously by users themselves.

According to a second aspect, the invention also permits, in conjunction with or independently of the first aspect above, an enrolment initiated during a prior exchange session (transaction), to be finalised/locked in a quasi-transparent manner or one quasi-familiar to the user, whether the session has been completed in the preferred case or not.

The invention may consist in separating from one another the various stages of enrolment, comprising, on the one hand, the storage of biometric data and, on the other hand, a secure finalisation (or locking/activation) of these biometric data (with the finalisation process ensuring that the data are assigned to the holder of the transaction device completing the finalisation).

The secure finalisation can be completed in a manner that is transparent for users or in hidden time, for example on the occasion of the first standardised transaction in which they have to provide authentication, for example by entering a secret code (PIN or other code . . . ).

Thus, users do not waste time on completing their enrolment or on travelling to a specific place (bank branch . . . ). They can initiate the enrolment anywhere at any time and/or finalise/lock it anywhere at any time in a transparent manner, or more specifically and preferably, during the course of a standardised transaction authentication.

Thus, the invention permits at least one stage of the enrolment to be speeded up/facilitated, namely the initiation and/or finalisation (locking or activation) stage. The invention permits the initiation stage, where necessary, to be separated out from/made independent of the finalisation stage, with its being possible to complete these stages at/divide them up between several different places (home, bank branch, merchants) and/or to allow them to be staggered over time (several hours or even several days).

The invention may also permit the initiation (or storage) of biometric data to be completed, where necessary, on one occasion, twice or several times at different locations or during different transactions.

For this purpose, the invention relates to a method for enrolling holders of biometric transaction devices that comprise the following steps:

storage of at least one biometric pattern in the device, characterised by the fact that it comprises the following steps:
  a) supplying holders with a portable and mobile power supply connector that is configured to trigger the said storage,
  b) and/or activation of the biometric pattern, the said activation being done in response to or in association with the holder's successful authentication.

According to other characteristics:
The power supply connector has a configuration with a polarity and/or connection of its pins that does not comply with ISO 7816, or at least not completely; this specific configuration can thus be detected by the biometric device (card);
The said storage is done during a first information exchange session with the device and the said activation is done during a second information exchange session with the device, separate from the first one;
The said connector is configured to carry a voltage or signal for triggering the said storage on the pins, different to those provided for by the ISO 7816 standard, a reset signal emitted outside the time period provided for by the ISO 7816 standard, a logic or analogue signal;
The said activation is done on the occasion of an electronic transaction implementing a biometric authentication step and/or a non-biometric authentication step;
A transaction terminal approved by a transaction service provider is used for the said authentication, a user-processing unit comprising a secure transaction application, by delegation from a server or transaction service provider;
The said activation:
  is done on the occasion of a standardised transaction session using a transaction terminal with biometric data presentation and presentation of the holder's PIN code;
  implements a mobile software application linked to a remote service server generating, in response to said authentication, a code representing the said authentication;
  implements a mobile application that emulates a transaction terminal;
  triggers the issue of a secret code; the code is intended for the holder, who subsequently enters it into the device, with or without the holder's biometric data.

The invention also relates to a system for enrolling holders of biometric transaction devices, the said system being configured to store at least one biometric pattern in the device, characterised by the fact that it comprises:
  a) a portable power supply connector configured to trigger the said biometric data storage,
  b) and/or that it is configured to activate at least one biometric pattern in response to or in association with the holder's successful authentication;

According to other characteristics:
The said device comprises a software agent manager to perform the following steps:
  triggering or checking the activation of biometric patterns upon detection of a successful biometric authentication and/or another successful authentication;
The said device comprises a software agent manager to perform the following steps:
  triggering or checking the activation of biometric patterns upon detection of a successful biometric authentication and/or another successful authentication;
The said device comprises a software agent manager to perform at least one of the following steps:
  notifying a transaction application to continue the transaction with PIN authentication when it detects the absence of stored biometric data;
  notifying the transaction application to continue the transaction with PIN authentication when it detects biometric data that have been stored but not activated;
  checking or controlling the activation of biometric data that have not yet been activated upon detection of a successful biometric authentication and/or another successful authentication.

Thus, thanks to the invention, users can autonomously store their fingerprint on a biometric sensor card, without the need to go to a physical location (such as a bank branch) or to use a connected processing unit and a software application with specific, unfamiliar instructions.

The connector is particularly simple and economical to make, this being done merely by connecting its pins, which partially differ from ISO 7816.

The invention permits biometric data to be stored (or entered) completely autonomously and in complete tranquillity, away from a bank branch, notably at home, or anywhere else; the invention also permits the enrolment process to be finalised (locked) later, away from a bank branch if possible, during or on the occasion of a regular, preferably standardised, transaction in a routine transaction procedure or one that is familiar to users.

DESCRIPTION

Figures 1A, 1B, 1C:
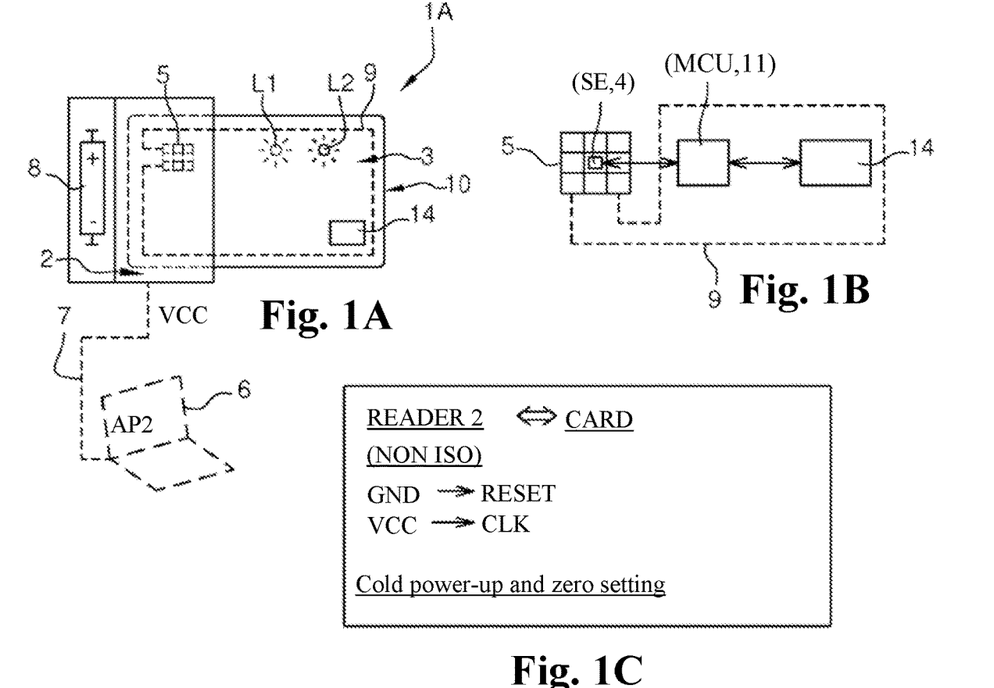
FIGS. 1A-1B illustrate an enrolment initiation system with a transaction biometric card based on a preferred embodiment of the invention.
FIGS. 1C-1E illustrate electrical and software tools that may contribute to the initiation of the enrolment.

Illustrated in Figure IA is an IA system for enrolling a holder of a biometric transaction device 3, based on a first preferred embodiment of the invention or implementation of its method.

A transaction is preferably understood to be an electronic banking transaction, in particular a standardised EMV electronic banking transaction or one of any other electronic exchange, between a biometric transaction device and the outside world [terminal at the point-of-sale (POS), cash dispenser (ATM), terminals enabling access to a building, to a transport, payment service . . . )]

A biometric pattern is understood to be biometric data that are unique to users, such as a fingerprint pattern, the iris of their eyes, their DNA, their voice, etc. In the present description, the biometric pattern may also equate to or designate either minutiae or fingerprints or, more generally, biometric data of any kind.

When enough patterns (minutiae or fingerprints) have been stored, together they form a reference template that can be referred to for the purposes of authentication through comparison with another newly captured pattern with a certain degree of similarity.

The reference template can be referred to either as that or as a reference pattern (or minutiae or fingerprints). Similarly, the terms locking, activation, validation, finalisation are equivalent terms. They represent a step in the process as brought about by the invention, a step that is completed under different conditions or environments or levels of security.

Transaction device is understood to be a portable communication device such as an electronic smart card 3, an electronic smart watch, an electronic bracelet communicating in particular via electrical contacts 5 and/or in contactless mode via an antenna 9 in a card body 10, based on near-field technology (NFC) or RFID (radio frequency identity device), Bluetooth™, or UHF. The biometric device may also include or constitute a USB key, a smartphone, a computer, a tablet, or a PDA.

This 1A system is conventionally configured to store at least one N1-N7 biometric pattern in a memory 25 or register of device 3 via a sensor 14, in this case a fingerprint sensor.

According to a preferred embodiment of the first aspect of the invention, system 1A comprises a portable power supply connector 2, configured to trigger the storage of at least one N1-N7 biometric pattern (FIG. 7) or a series of several biometric patterns until a reference biometric template 40 is formed, in particular as the result of portions of fingerprints being assembled.

Connector 2 can preferably be equipped with a stand-alone clean power source, using a cell/battery or battery 8, or have a power supply and/or communication connector such as a USB cable.

Preferably, connector 2 includes an internal electrical connection configuration to permit the negative pole of the device battery to be connected to the ground (GND) pin of the device board connector but also at the same time to the RST pin; if necessary, the GND pin can also be connected to the I/O pin.

Thus, the invention provides for a configuration of connector 2 with a polarity and/or connection of the pins of connector 2 that is not fully compliant with ISO 7816.

The positive pole of the battery is connected both to the power supply (VCC) pin of the ISO 7816 connector of the device (FIG. 1C) and also to the device connector pin (CLK) corresponding to the card contact pad (CLK). Nevertheless, the invention may also provide for any method of ensuring a power supply, including by contactless means (e.g. induction charger, contactless reader . . . ), but equally for there to be capacitors in reader 2 and/or device 3.

Connector or reader 2 has no mechanism for sending a particular signal to the card. It is just its internal wiring that is particular. And it is the card (at least the OS operating system of the SE chip 4) that is configured to detect this particular wiring in such a way as to trigger the enrolment to start.

In the example, for the P60 chip (SE chip from NXP used for cards), the inventors decided to wire the VCC and CLK pins of smart card connector 2 to the "+" (it is in fact simpler to detect the signal with this chip).

On the other hand, for another SE chip, the VCC and RST pins of the connector could for example be wired to the positive pole of the battery (this may depend on the type of chip, it may be easier, based on the chip used, to detect a particular wiring or other).

Thus, the invention provides for a smart card connector with standard pins, but whose internal connections or wiring ensure only a standard match between the positive pole of the battery and the VCC pin of the connector and between the negative pole of the battery and the GND pin of the connector. The other RST, I/O, CLK pins of connector 2 (standard with regard to the form or configuration or geometrical position of the pins) can be wired to one another differently to ISO 7816, in particular wired in parallel with one of the VCC or GND pins.

According to a second aspect of the alternative preferred embodiment, independent of or additional to the previous one above, system 1A, 1B, 3 is configured to perform a, preferably secure, activation of at least one biometric pattern in response to or in association with the holder's successful authentication. Validation is done preferably when reference template 40 is composed of sufficient N1-N7 biometric patterns or data.

Alternatively, in a less preferred but possible way, the card may include a battery (a battery or capacitors of small overall dimensions and/or rechargeable) at least, to ensure a partial or full enrolment that at least includes storage.

For the above purpose, the device may include an LED or other indicator to tell users when a capacitor or battery is sufficiently charged to capture and store biometric data. If it is a primary battery, a switch button can be added. If it is a rechargeable power source, a LED indicator may be suitable.

System 1A, 1B, 3 can preferably, but not exclusively, be configured to undertake full (or complete) storage of N1-N7 biometric data, sufficient to form a reference template 40, during a first information exchange session with device 3 (without a break in this same first session) and secure activation on the occasion of a second information exchange session with the device, separate from the first session.

Users can be notified, preferably by a signal from the device, when the captured/stored biometric data are complete for enrolment. Alternatively, when more than "n"

different patterns (2, 3 or 5 . . . ) have been stored, device 3 (in this case, the card) may with the aid of a pattern input counter consider this sufficient to constitute a reference template 40.

This system 1A, 1B, 3 may also include or implement (described later in FIG. 8) a second reader 31 (preferably separate from connector 2 and which may be a POS terminal, an NFC mobile, an ATM cash dispenser . . . ) to finalise/activate at least the reference biometric template 40.

The system may optionally include a suitable remote authentication server and/or a card 3, adapted according to the invention to undertake finalisation; the above means of finalisation are configured to lock/activate the stored biometric data using a validation signal received in device 3 in response to the holder's authentication.

According to the invention, the device can be configured to perform the following steps:
a) supplying holders with a portable, mobile power supply connector 2, 7, configured to trigger the storage of biometric data,
and/or
b) activation of at least one biometric pattern, the said activation being done in response to or in association with at least one successful authentication of the holder.

(The first aspect referred to above may include at least the step in (a) above and the second aspect may include at least the step in (b) above.

We Will First Describe the Elements of a) Above and then b).

In the example, device 3 is a smart card for transactions, in particular banking transactions. The device preferably includes a contactless functionality, for example a radio frequency interface (antenna 9) for proximity according to ISO 14443 and an SE radio frequency microcontroller capable of decoding and/or transmitting radio frequency communication frames.

In the example, the smart card includes a communication interface with contacts 5 (or ISO 7816 bus) but could alternatively be any wearable such as a watch or bracelet and have a different type of interface such as USB. The card will preferably be a hybrid interface card with contacts 5 ISO 7816 and contactless ISO 14443 with antenna 9 in the card body 10.

The device comprises a security microcontroller with an (SE or 4) microchip, a first interface 5/communication port (notably ISO 7816) connected to the (SE, 4) security microcontroller, at least one (MCU, 11) peripheral electronic component connected via a second interface/communication port to the security element 4.

If necessary, some or all of the functions of the MCU component 11 may be incorporated into the security component or vice versa.

Figure 1D:
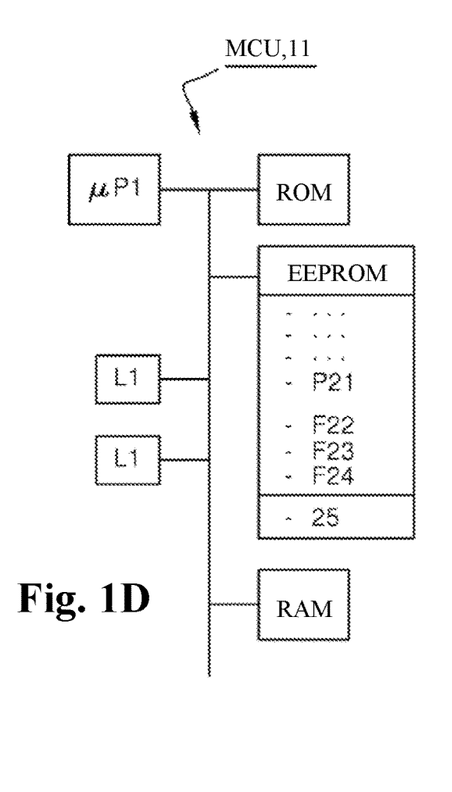
Figure 1E:
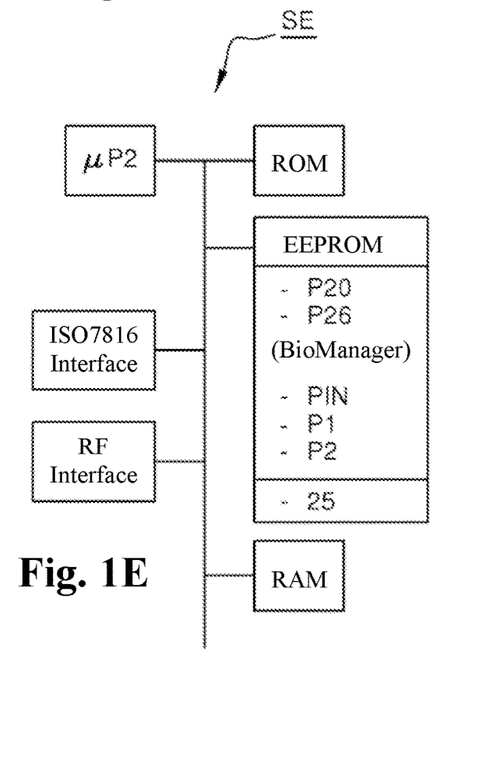

The card is equipped in this case with a terminal block of contacts 5 (referenced C1-C8 according to the standard ISO 7810), connected to the SE chip 4 via its standard communication bus ISO7816-3 (only the (RST) and (CLK) lines are illustrated in FIG. 1C). Card 3 incorporates an SE secure element 4, comprising a pP2 microcontroller or microprocessor (FIG. 1E) in the form of a standard smart card microchip. The SE chip 4 is in this case a hybrid contact and contactless chip, reference P60D081, from the company NXP for example, but could be simply a contact chip.

The card has a peripheral MCU component 11, which may or may not be a secondary microcontroller or co-processor, slave or not, of the SE microcontroller 4. The SE microcontroller 4 may be a bank [card] chip. The MCU component may include a pP1 microcontroller or microprocessor (FIG. 1D), a WTP generator (single-use number) or other functionalities (cryptogram generation especially for a dynamic DCV cryptogram), etc.). The MCU component 11 is connected to a fingerprint sensor 14, which is flush with the surface of the card body.

Depending on its characteristics, the card can be configured to initiate biometric pattern storage autonomously with a dedicated external power supply connector 2.

System 1A preferably comprises a smart card connector 2. It is preferably supplied to users with the card. This connector may include a power source 8 (battery) or a power supply cable 7 to a power and/or communication source. In this case, the cable is a USB type cable. The IA system may include a computer 6, which may preferably be the user's computer. Where necessary, the specifically configured connector of the invention may include a voltage-matching function for the card. USB-type data cables may be rendered non-functional from connector 2. The invention may provide for using the power and ground (GND) connections of a USB cable only in connector 2. Thus, when connecting to a computer, there is no risk of hacking from the computer.

Alternatively, computer 6 may be any other computer, in particular an access terminal or kiosk connected to a server linked to the transaction service (or software application) contained in the card.

The computer may include AP2 software to initiate/trigger the storage of biometric fingerprints. The software can send some signal or other, intended for the card, to launch storage.

As an alternative to the AP2 software, any key pressed on the keyboard may be sufficient to send a signal to the card and be detected by the card to initiate enrolment. The card may include a secure launch programme (notably in P26) that opens a window on the computer screen to request a PIN code to be used to initiate fingerprint storage if the PIN code is correct.

Connector 2 may be a dedicated connector used for enrolment: it may preferably be configured to allow a "non-ISO" start-up of the SE security chip 4. The chip contains in this case notably P20 banking transaction applications, in particular according to the EMV standard; it can contain the PIN code or a remote PIN code verification application on a dedicated server, in particular a bank server.

According to an example of a preferred embodiment of the connector/reader 2 configuration, the latter may be modified (FIG. 1C) to allow a cold power-up and zero setting of the SE chip 4.

According to this example, the reader/connector 2 is modified to permit the GND pin (or negative pole of the battery) to connect (in addition to the GND contact pad of the card) the RESET (RST) pin of the card (or even the I/O pin also); the card is also modified to permit the VCC of the reader to connect the clock signal CLK pin of the chip (in addition to the VCC pin of the chip). Thus, when the card is connected to the reader, the chip starts up immediately, passing the baton to the operating system (OS). This is the mode of implementation using the P60 chip. However, this could be different from another "SE" chip.

The SE chip 4 can include, according to this preferred mode of detection of an enrolment environment, a software application P1, which counts the time after the VCC voltage rise and detects the TR time of reception of an RST signal. If the TR time is less than, for example, 400/F (F being the frequency in hertz) and there is no signal on the CLK pin of the card, then the application P1 triggers the enrolment initiation procedure (P2), for example in the MCU microcontroller 11), with the storage of biometric patterns (one or more up to the predefined rate).

Thus, according to the invention, the reader/connector 2 may contain essentially or only a card receiving body 2, a cell/battery 8 (or cable 7) to supply the card with power, pins for communication with the card so as to reduce the cost or any modification of the connector.

The reader/connector 2 may in this way dispense with intelligent microcircuitry or a programme/driver, in particular a card reader, microcontroller. Thus, with the aid of this connector, the invention permits an autonomous enrolment process to be started, in particular at home, at a negligible cost.

Alternatively, to a more sophisticated (and expensive) degree, the reader may contain a microcircuit (or microcontroller) and a software application that sends a specific signal (digital or analogue) to card 3 as of the first exchanges between reader 2 and card 3. This signal triggers the initiation of the capture or storage of the device holder's biometric data.

Alternatively, the reader 2 can be configured to generate a specific voltage/current or clock frequency level that can be detected and recognised by the card. This may mean specific software embedded in the reader to modulate the exchange signal with the reader or an equivalent circuit performing the above functions in hardware form or a wired circuit.

The reader/connector 2 can supply power to device 3 by emitting an electromagnetic (RF) field. The reader may have only this function of radio frequency field power supply with or even without data being transmitted via the electromagnetic field. The storage trigger detection can provide for a preset frequency determination or a particular wave train (or signal amplitude level); device 3 can dispense with an interface with electrical contacts.

The invention therefore provides for card 3 to detect the specific reader/connector 2 to initiate the enrolment or storage of biometric patterns. The card can in particular be configured to detect that it is not in a specific enrolment initiation environment but rather in a, for example banking (by exchange with a POS), transaction environment, and this due to the existence and detection by the card of a known predetermined transaction procedure: APDU commands for this procedure . . . . By default, the card can launch an enrolment sequence with biometric data storage whenever such a transaction environment is not detected and vice versa.

Alternatively, the card can be configured to detect that it is not in a standard, in particular EMV, transaction environment. In this way, the invention prevents a fingerprint enrolment/storage process being accidentally initiated when the card is supplied with power following its insertion into a transaction reader, in particular a banking (POS) transaction reader, other than the reader 2 specific to storage.

In the case provided for in b) above (which may be without a dedicated connector 2, 7—in particular for enrolment outside the home, at a branch or point of sale), the invention may provide for a traditional smart card reader (ISO) and the initiation of the enrolment may be triggered by a conventional APDU command.

As an alternative to the preferred embodiment (including a) above), the connector/reader 2 may not contain a battery 8 but may have a cable for connection to a personal computer 6 (FIG. 1A). In the same way as before with battery 8, the SE chip can detect a cold power-up and zero setting due to a permutation of the above-mentioned links (RST, CLK) in connector 2. The advantage lies in not modifying computer 6 by adding an AP2 programme.

Alternatively, the personal computer 6 can be provided with a specific AP2 software application to send the card a predetermined enrolment trigger signal recognised by the card.

The device 3 may preferably contain indicator/warning elements (sound, light, coloured . . . ) configured to communicate with users according to a predefined protocol. For example, it may comprise two LED lights (L1, L2) in the card body 10 or on the surface, powered by an electrical circuit in the card, driven by one of the card's microcontrollers, such as the SE security element 4 or the MCU biometric capture microcontroller 11.

Alternatively, the reader/connector 2 may include these L1, L2 indicators driven by signals from the card. The circuit may comprise a detector of the output level from an I/O port of the chip and a relay driven by the detector to close or open logic/analogue switches placed on the power supply tracks of the LEDs, with the said tracks connecting the LEDs to the VCC and GND pin.

The two LEDs can also be driven by two "GPIO" ports of the MCU 11 that trigger two transistor switches (MOSFET) of an LED power supply circuit. However, it is preferable not to power the LEDs while the MCU microcontroller 11 is processing. The LEDs can only be switched on at the end of the process. Depending on the session, one way in which the LEDs may operate is as follows.

In an enrolment operation: Flashing green LED (e.g. 100 ms every second) to signal to users that they can place their finger on the device or capture their fingerprint. When a finger is detected, the LEDs may go out.

In a biometric data verification operation: no LED until verification is complete. In case of a successful match/comparison test, the green LED can light up (for example, for ½ second). If the comparison fails, the red LED can light up. Another operating mode: an LED may flash during the verification phase—when a finger is placed on the device—until it becomes a solid light (green=OK, red=not OK).

At the end of the process of acquisition/extraction of biometric data, if the quality is OK for enrolment (reference template 40 created), the green LED remains "on" for 1 second, otherwise the red LED remains "on" for 1 second. You could also resume flashing directly (without displaying a red LED that might unsettle users).

Then the green LED starts to flash again, flashing a little faster (e.g. 100 ms every 800 ms). At the end of enrolment, if enough biometric data have been captured to validate the enrolment, an LED signal can be sent to indicate the following status: "enrolment (or storage) completed—but not activated".

We Shall Now Describe the Second Point (b) Referred to Above.

In this case, there may be no connector 2 supplied to the holder (e.g. if it is a POS . . . ). The device (in this case a card) is, according to the preferred embodiment of the invention, configured in such a way as to undertake the activation (alternatively or in conjunction with point a) of the reference biometric pattern, the activation being preferably undertaken in response to or in association with at least one successful authentication of the holder, or even two authentication factors for greater security.

Activation that does or does not include one or two authentication factors, depending on the invention, can be implemented as easily and transparently as possible to improve the user experience.

The finalisation of the enrolment including this activation can preferably be undertaken during a standardised transaction, in particular a banking transaction such as the EMV type banking transaction that users regularly perform. Activation can be undertaken during any exchange of the device with the world outside the device.

In practice, according to the preferred embodiment of the invention, users start the enrolment (storage of biometric patterns) at home and finalise the enrolment (activation of the stored patterns) later on the first occasion of data exchange with the outside world. This may be on the occasion of a standardised transaction in a manner that is transparent (or quasi transparent) for users.

Depending on its characteristics, for the finalisation (activation) step, the device can be configured to detect an electronic banking transaction environment beforehand. By default, the card can detect the fact that it is not connected to the connector 2 and switch to activation (e.g. if it detects a normal ISO 7816 reading process (e.g. different to the process illustrated in FIG. 1C).

The card switches to activation preferably if it receives a signal indicating that authentication has taken place (in our case, when the PIN has been presented at a POS). The type of reader used is not necessarily detected.

In the example, the hardware and software architecture elements of the card are described below. It is known (FIGS. 1D, 1E, 2-4) that the card may include a software application or (or application programme), for example a biometric banking application, especially for payment (P20); this may be an application specified by the payment schemes, allowing users to be authenticated through presentation of their PIN or by biometric recognition (e.g. recognition of a fingerprint) or vice versa.

The card is known to include (FIG. 2-4):
- a P21 application for management of the biometric data enrolled/stored notably in the MCU chip (equally referred to as the biometric data manager);
- an F22 "Capture" function (or application) implementing a process triggering the acquisition of an image or biometric data on the biometric sensor 14;
- an F23 "Extraction" function (or application) implementing a process of converting raw data (images) into compressed data (or minutiae) to speed up recognition;
- an F24 "Comparison" function (or application) implementing a process of recognising the newly acquired or captured image and comparing it to the previously stored enrolment image (or reference template 40);
- a register 25 or a backup memory of enrolled biometric data, activated or not activated.

In the example, the invention proposes that, according to a preferred embodiment, card 3 should additionally include a P26 application (biometric data enrolment manager or "BioManager"). This P26 enrolment manager has the advantage of interfacing or closely cooperating with the P20 banking application (in this case, in the SE microcontroller 4 but it could be elsewhere, notably in the MCU, 11). In particular, the P26 application programme can be configured to cooperate with P20 to determine how the transaction should proceed (with or without a PIN) based on the enrolment status or information that it has available to it (or that is made available to it);

The P26 programme can also cooperate with P20 to lock/activate the stored biometric data at the appropriate time (especially when all required security has been met: for example, following dual authentication).

The P26 "BioManager" application is in this case in close communication or cooperation with the payment application P20:

In particular, the P26 "BioManager" application may permit the P20 biometric payment application to retrieve the result (OK, or the recognition score for biometric data captured during authentication) of the biometric identification performed by the biometric collection chip, in this case the MCU chip or microcontroller 11.

According to a specific configuration of the preferred embodiment of the invention, the SE chip 4 includes a feature (or application or step) 9 that permits information (or commands) to be sent to the biometric data enrolment manager "BioManager" P26 whenever the PIN is verified during an "EMV" type transaction in the payment application P20.

The payment application P20 may also receive E4 information from the BioManager P26 indicating that the reference template 40 has not yet been activated or validated (P26 having been notified of this status by P21);

Similarly, P20 may receive E7 information indicating that the biometric data have been stored (enrolled), are not yet activated and that they do or do not match the data newly acquired during a transaction session (P26 having been notified by the MCU).

Figure 3:
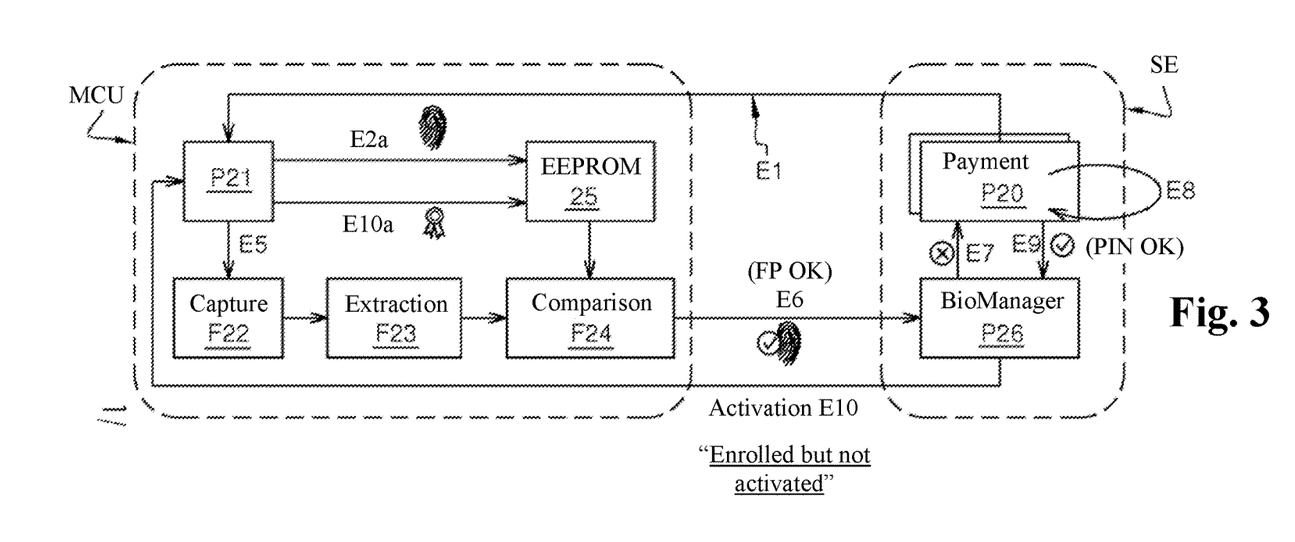
FIG. 3 is similar to the previous figure but concerns an operation where the enrolment (storage) is done but not activated.
Figure 6:
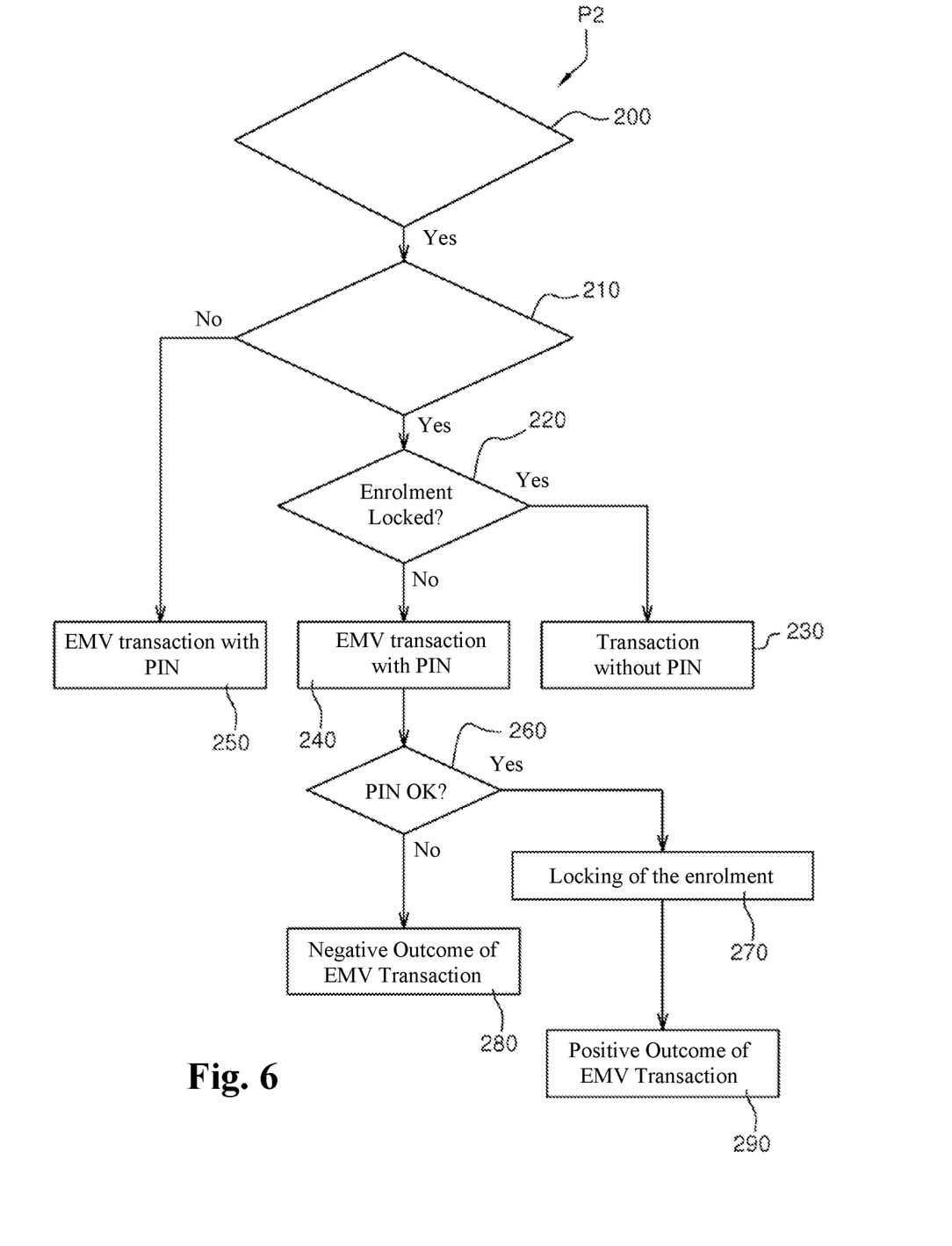
FIG. 6 illustrates, in a preferred embodiment, different stages of the finalisation process (locking/activation) once biometric data have been stored and during a standardised banking transaction, such as EMV.

The invention may also provide for a feature (application or step) E10 in FIG. 3 or 260 in FIG. 6), triggered in this case by P26, which notifies the manager programme P21 of the enrolled biometric data to activate (E10, E10a) the enrolment when the PIN is verified (260) and there has been a successful biometric recognition (270, E6) during the same exchange session (only if the storage has not yet been activated). This E10 function is managed by the "BioManager" P26.

The invention may also provide for a feature (application or step) allowing the biometric data enrolled/stored in the memory 25 to be updated (E10a) upon receipt by the manager P21 of an activation command E10 for these biometric data, the said command E10 being issued by the enrolment manager P26 (BioManager).

In general, all or some of the MCU's applications can be made available in the SE chip or vice versa. Similarly, it is possible to have a single secure microcontroller only performing all the functions divided up between two microcontrollers. Preferably, the SE chip is master to the MCU but, alternatively, each can be master to the other in turn.

Figure 5:
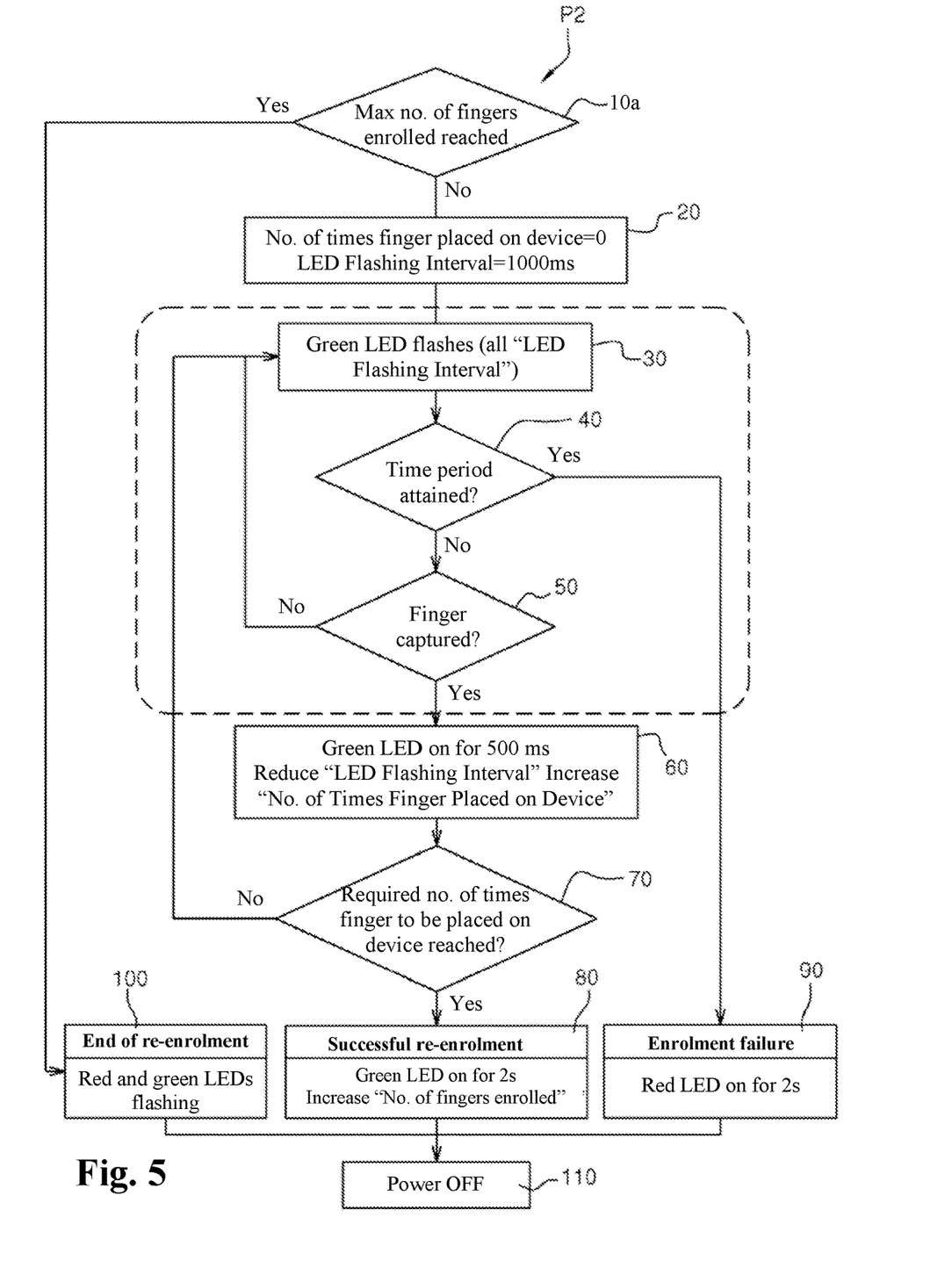
FIG. 5 illustrates various steps in the initiation of the enrolment (storage) of fingerprints.

We will now describe the operation of the invention (enrolment initiation) by going through the steps of the process as illustrated in FIG. 5 and in relation to system 1A, the device being a card 3.

Initialisation of the Enrolment (or Storage) (FIG. 5)

In step 10 (not shown), the card has been inserted into the specific reader 2 and a non-ISO signal is detected by the SE microcontroller 4, which in response triggers the initiation of the procedure of registration (or enrolment or storage) of the biometric patterns (for example: detection of a rise in the RST signal before the minimum time period required by the ISO, after a rise in the VCC signal or a cold power-up and zero setting as illustrated in FIG. 1c).

A "10a" test of one of the MCU or SE chips queries the P21 (Biomanager) manager of the enrolled biometric data, in particular through consultation of the register

25 (FIG. 2), to find out whether the maximum number of fingers enrolled has been reached;

In steps 20/30, (above test negative), an LED on the card indicates that the enrolment phase has started (for example by flashing the green LED at a slow frequency); for this purpose, an alternating high and low signal or potential may be placed by the SE or MCU on one of its GPIO pins leading to an LED;

In step 40, after a period of time, if no finger is placed on the device (or recognised) during the waiting phase, the enrolment/storage procedure is interrupted and a signal is sent to users (for example, the red LED continues to be a solid light for 2 seconds).

Figure 7:
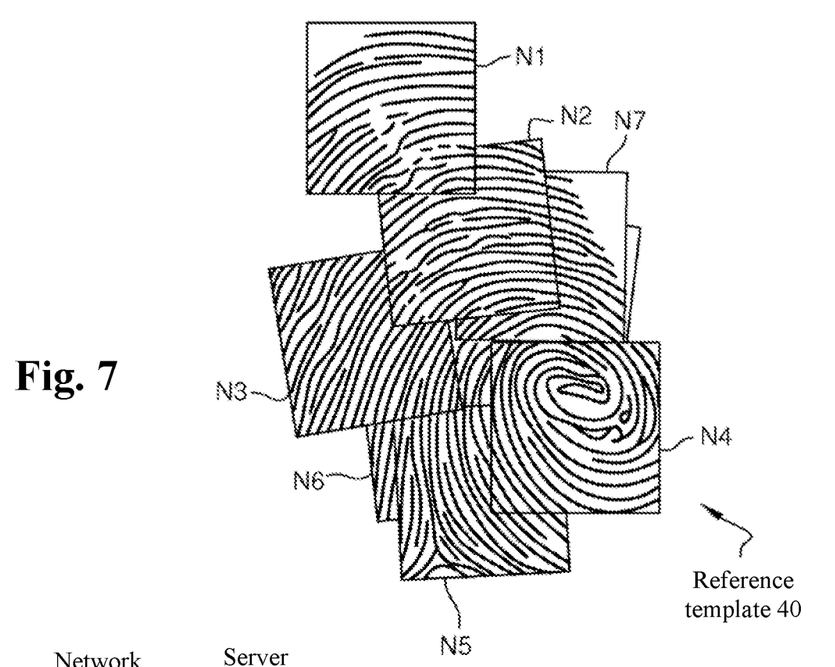
FIG. 7 illustrates an acquisition of seven fingerprints that are juxtaposed (or assembled/combined) in memory 25 of the biometric device to portray a reference fingerprint (reconstructed from several fingerprint portions).

In step 50 (period of time has not elapsed), users can then place their finger on the fingerprint sensor several times to cover a sufficiently broad area of their fingerprint (by reconstructing the successive images (N1-N7, FIG. 7).

Each time a registration is correctly done, users can be sent a signal (e.g. by leaving the green LED on for 500 ms), and the LED can then flash again to indicate that another fingerprint capture should be done and so on.

In step 60, users follow the progress of the procedure through the LEDs on the card (for example, by noticing an acceleration or reduction in the frequency with which the LEDs flash) after each successful registration;

In step 70, the required number of captures of biometric patterns has been reached;

In the subsequent step 80, the green LED indicates to users that the procedure has been completed (for example, the green LED continues to be a solid light for 2 seconds).

In step 110, the card can be switched off.

The user can enroll a second finger (or recommence the failed enrolment of the first finger) by removing the card from the specific reader and reinserting it (the same procedure will be repeated).

Back to step 10*a* (branch yes), when the maximum number of successfully enrolled/stored fingers has been reached in step 10*a*, the LEDs on the card signal in step 100 that the quota has been reached (for example, by alternating flashing green and red LEDs for 2 seconds).

If the card is removed from the specific reader and reinserted, the same quota reached signal will be visible to users. The enrolment is then complete.

The invention may provide for two functions related to storage as follows:

The card can block storage once the fingerprint storage limit has been reached (with a reset mechanism if necessary: in particular a double tap of the finger on the sensor 14, or some other option such as a long press, the presentation of a specific pattern . . . );

Or the card allows users to re-enroll fingers as long as they use the connector (e.g.: if the limit on the number of fingers that can be stored is three, then the card keeps the last three fingers enrolled (the old fingerprints can be stored cyclically).

Preferably, for security reasons, the invention may provide for locking only one fingerprint at a time. If there are several registrable fingers (say "n"), according to this preferred embodiment, users will have to register from finger 1 to finger n in one and the same session. Then all enrolled fingers will be activated on the occasion of the first transaction with a recognised PIN code.

However, for greater security, the invention may provide for the registration of "n" fingers. Then, on the occasion of the first transaction with a recognised PIN code, if the finger "x" (included among n) is also recognised, then only this one is activated. If the same finger is placed on the device again at a later date, the PIN code will no longer be required.

However, if another finger "x1" different from finger "x" is placed on the device, the PIN code will have to be retyped to activate this other finger "x1".

Generally speaking, it is not necessary to reach the quota of authorised fingers in order to activate/lock the enrolment. It is sufficient for there to be at least one successfully enrolled finger.

Enrolment Reset (Optional).

As long as the enrolled fingers have not been locked, the invention may provide for all the enrolled fingers to be erased and for the procedure to be repeated by sending a particular signal to the sensor (e.g. by tapping the biometric sensor twice in less than 500 ms if an enrolment process is not in progress).

Users will then be notified of the erasure by the LEDs (for example, by the red LED flashing for 2 seconds).

Locking/Finalising/Activating Enrolment (Step 80)

Figure 4:
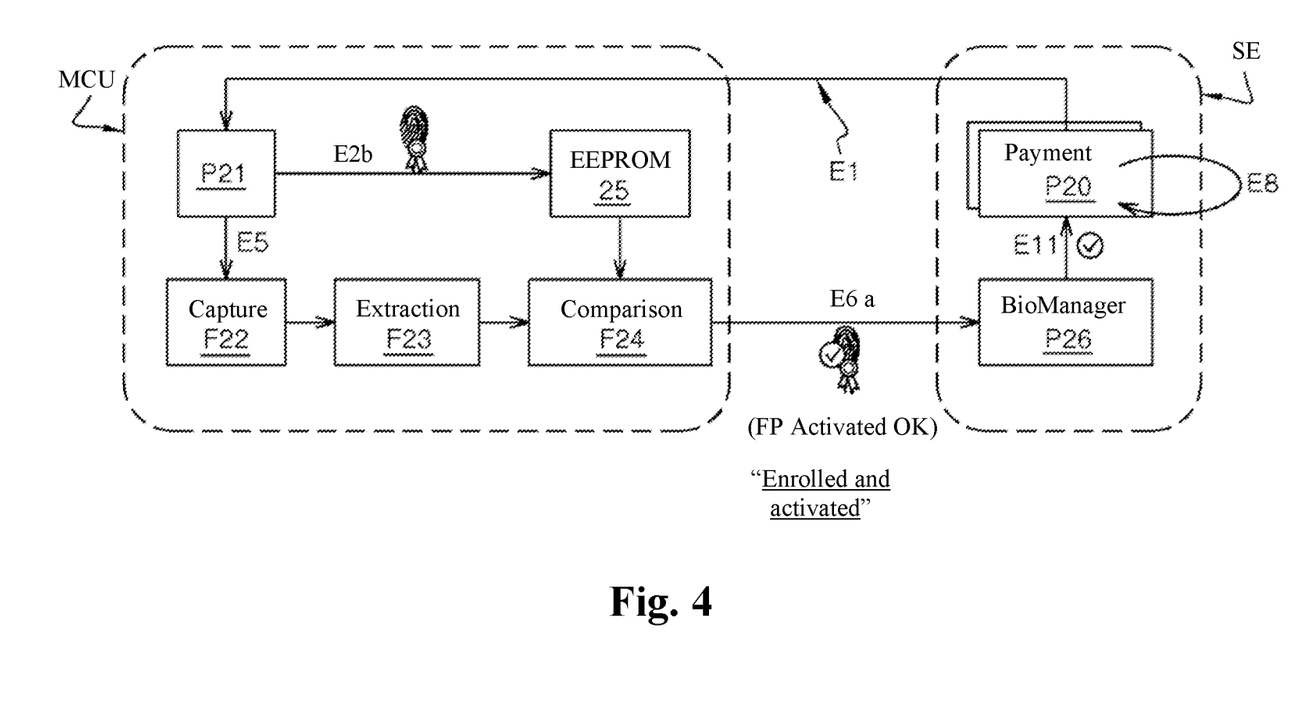
FIG. 4 is similar to the previous figure but concerns an operation where the enrolment is done and activated.

When at least one finger has been successfully enrolled/stored, the enrolment can be locked (according to FIG. 4 or FIG. 6).

Operating Principle of the Invention (FIG. 6) According to a Preferred Embodiment for Undertaking an Enrolment Lock Via a Transaction on a POS Terminal, with a Verified PIN.

At step 200, when paying at a POS and in advance of the transaction, the programme tests to make sure that the number of fingerprints stored is not zero; then if successful, it moves on to test step 210;

In test step 210, the newly acquired new fingerprint (or biometric pattern) is compared with at least one fingerprint previously enrolled or stored in the register 25, irrespective of whether the latter has been locked (in particular, activated with an activation indicator) or not;

If the 210 test is negative (branch NO), the fingerprint is not recognised, the P2 programme of the invention loops to an EMV transaction operating mode with PIN (step 250);

If test step 210 is positive (branch YES), the fingerprint has been successfully recognised and the programme connects up to the next test step 220, In step 220 (branch YES), the programme checks that the enrolled fingerprint has already been locked (activated), and if the test is successful, the programme connects up to step 230;

In step 230, the payment transaction takes place without users having to enter their PIN code (as described in the specifications of the payment schemes) since an activated/validated reference template has already been set up in the card;

Preferably, the invention provides for the possibility of locking only one finger at a time for security reasons (e.g. a person intercepts the card without the owner's knowledge and enrolls one of their fingers in among the card owner's fingers).

However, if the test 220 detects no lock (branch NO) (test 220 negative) even though the new fingerprint has been recognised, then the P2 programme connects up to the next step 240, where users have to present their PIN (as if they had not presented a fingerprint or it had not been recognised);

In test step 260 (following step 240), the payment application (P20—FIG. 3) has successfully verified the PIN (PIN OK) during the transaction and a proprietary command (E10—FIG. 3) corresponding to step 270 (FIG. 6), is sent to the P21 application managing the locking of the enrolled fingerprint in order to signal the user authentication. This command E10 leads via P21 to an activation of the enrolled/stored data E10 in the register 25 (FIG. 3). The MCU's P21 manager stores an activation state associated with the enrolled minutiae in the register 25 (instead of a previously non-activated state).

At test step 260 (branch NO), the PIN typed in is not correct, and the programme of the invention therefore moves on to the EMV transaction at step 280, which thereafter unfolds as standard (for example, by asking for the PIN to be retyped or by rejecting the transaction).

In FIGS. 5 and 6, the different steps correspond to possible steps in the process of the invention and/or steps of a software operating programme executed by one of the SE and/or MCU microcontrollers. Same for FIGS. 2 to 4. The steps in the P2 process may match or be equivalent to those in the BioManager P26 programme.

Figure 2:
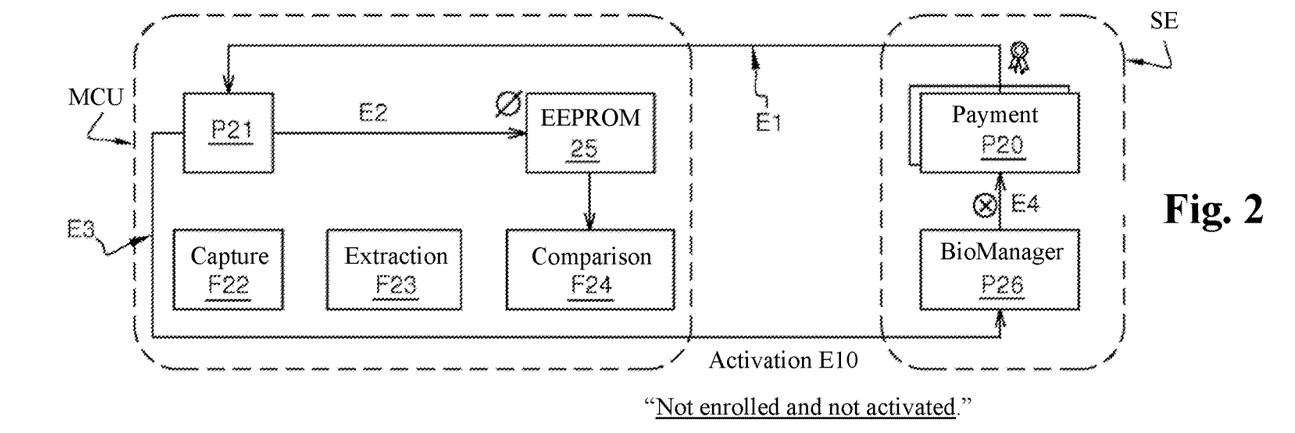
FIG. 2 illustrates the card's (MCU and SE) microcontrollers with the application programmes contained therein and the interactions (or operating steps) where the enrolment is not done and not activated.

The step of finalising or activating the enrolment will now be described in close connection with FIGS. 2-4 illustrating respectively three possible situations below:

FIG. 2: fingerprint not enrolled and not activated;
FIG. 3: fingerprint enrolled but not activated;
FIG. 4: fingerprint enrolled and activated.

Concerning the Situation (not Enrolled and not Activated) Relating to FIG. 2.

In step EI, at the start of a transaction, in this case an EMV banking transaction sequence using a payment terminal at a point of sale (POS), the SE chip 4 queries or consults the MCU microcontroller to find out the enrolment status, in particular whether biometric data are stored in the register 25.

For example, the SE chip can send an EI command, such as a request for the comparison of biometric data captured on the sensor 14, directly to the MCU microcontroller 11 via the P20 application. (The command can also be initiated via the P26 (Biomanager) manager;

In step E2, the MCU (notably via the enrolment manager P26) checks, reads or queries a register 25 of the enrolled minutiae to find out whether there are any minutiae registered or stored for possible comparison;

In step E3, having learned that no minutiae have been registered in the register 25, the MCU's P21 minutiae manager informs the P26 biometric data enrolment manager (BioManager) of this;

In step E4, the P26 enrolment manager "BioManager" informs the P20 payment application of this (no minutiae enrolled), and this results in the EMV transaction continuing in the P20 application and an authentication being implemented via a PIN code instead of biometric data.

Concerning the Situation Relating to FIG. 3 (Enrolled Minutiae not Activated): It May Also Partly Correspond to Steps in FIG. 6).

The EI step is identical to the previous case;

In step E2a, the minutiae manager P21 has found in its request to the register 25 that minutiae are enrolled/stored in the register 25 but not activated (or the enrolment has not been finalised);

In the next step E5, the MCU or P21 manager of the enrolled minutiae therefore instigates a process of capturing new biometric data via the capture application 22, followed by the extraction of new minutiae and the comparison 24 with the stored and not activated minutiae previously contained in the register 25.

In the next step E6, the positive result (FP OK) of the comparison is transmitted to the P26 enrolment manager application "BioManager";

In step E7, Biomanager P26 in turn informs the payment application 20 that the transaction must still be undertaken with the PIN (because the storage is not activated). This authentication also constitutes, advantageously, a transparent security measure for users, permitting the activation/validation of the biometric data);

In the next step E8, the payment application P20 proceeds with the EMV transaction by implementing a PIN (because the minutiae are not activated or the enrolment is not finalised)—(E8 may correspond to step 240 FIG. 6);

In the next step E9, when the PIN has been verified during the EMV transaction, information representing this e.g. "PIN OK" is sent by the payment application 20 or by the secure SE chip 4 to the P26 biometric data enrolment manager "BioManager";

In the next step E10, as soon as the P26 biometric data manager has (in this case, in the same transaction session) the two pieces of information E6 and E9 (FP OK and PIN OK) comprising the positive result of the biometric comparison and the positive result of the PIN code, then P26 sends a request for activation E10 (of control or finalisation) of the enrolment to the MCU microcontroller, in particular to the P21 manager of enrolled minutiae;

In the next step 11, the MCU or the P21 manager updates the information for the enrolled ([but] not activated) minutiae by activating them (for example by storing in the register associated with the minutiae an activation or finalisation notification or an activation flag).

Thanks to this activation, the next transaction can now be carried out using instantly captured biometric data, without a PIN (see FIG. 4).

Concerning the Situation Relating to FIG. 4 (Minutiae Enrolled and Activated).

The steps differ from the previous case as of step E2b onwards in that the P21 manager notes in its request to the register 25 that minutiae have been enrolled (or stored) in the register 25 and activated (or locked);

In the next step E5, as before, the MCU or P21 manager of the enrolled minutiae instigates a process of capturing new biometric data via the capture application F22, followed by the extraction of new minutiae F23 and the comparison F24 with the reference minutiae previously stored in the register 25.

In the next step E6 *a*, the result "FP activated OK" (meaning fingerprint activated OK) of the comparison of the new minutiae with the activated reference minutiae is transmitted to the P26 biometric data enrolment manager "BioManager" application;

In step E11, the P26 BioManager manager informs the payment application 20 to perform the transaction directly without a PIN (the biometric authentication having been correctly performed against an activated/validated reference biometric template. (These steps may correspond to the steps leading to step 230—FIG. 6).

Figure 8:
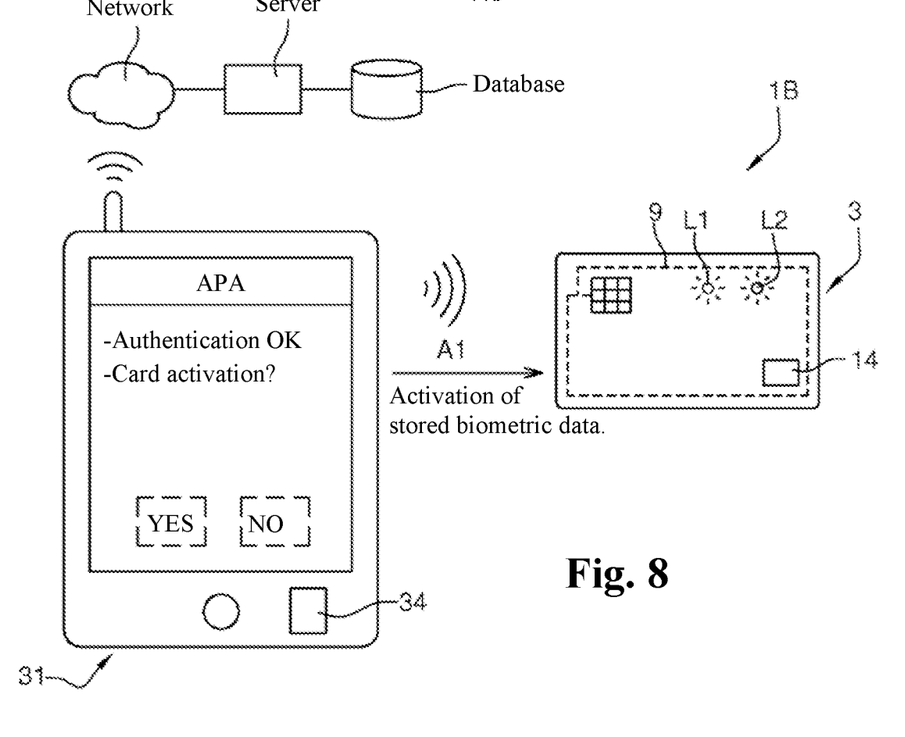
FIG. 8 illustrates (in a slightly less preferred embodiment) an activation of the biometric data stored in the device using an NFC mobile phone, possibly connected to a server and an authentication database.

Locking (Finalising or Activating) Enrolment Using an NFC Smartphone and an Application.

FIG. 8 shows an AI activation of the biometric data stored in the device 3 using an NFC mobile phone 31. The phone comprises biometric means of capture such as a fingerprint sensor 34 or any other means (camera/photograph of the face . . . . The phone may possibly be connected to a server via a telecommunications network and an authentication database containing users' previously captured biometric (or representative) data.

Users download a dedicated "APA" authentication/activation application from an online store using their smartphone 31 with near-field communication (NFC); then they proceed with their authentication in the dedicated APA application by any means, notably by entering biometric data for example, a photograph of their face or a fingerprint using the sensor 34.

The phone queries the database via the APA application to compare newly captured data (or a secure representative value) with captured minutiae (or values representing minutiae) stored in the database.

Where necessary, the biometric data (or equivalent representative values) may be stored in the phone using the dedicated APA application for direct live authentication and activation.

Upon successful authentication, users place the transaction smart card under their phone with the NFC enabled. The "APA" phone application indicates to users the fact that communication has been established with the biometric card and asks whether the user wishes to activate the biometric card.

Users can then validate the locking of the enrolled fingerprints and finalise the enrolment using the application on their phone by pressing the interactive display area "YES".

The card can send a signal back to the dedicated mobile APA application informing users of the success of the locking/activation procedure.

Once the enrolment has been locked/activated, it is no longer possible (preferably) to change or add an enrolled finger. Using the fingerprint to authorise payment is then possible.

This finalisation procedure (FIG. 8) is a possible alternative but less preferred for security reasons because the locked fingerprint is not necessarily verified on the dedicated application as belonging to the authenticated user.

Alternatively, in case of a reliable NFC connection, it is possible to undertake a fingerprint recognition in the card.

The invention has the advantage of permitting the acquisition of biometric data in peace and quiet at users' homes, in hidden time, in particular during a first session of information exchange or acquisition or storage of biometric data with the device.

It permits the acquisition of several successive patterns/fingerprints/minutiae, notably in a decentralised manner, until a sufficient rate or a full acquisition is achieved, thus ensuring the effective operation of any biometric authentication. A different storage session may for example be started through a new RESET signal or through the fresh detection of a signal indicating the initialisation of storage by the card or may be established between an initial power supply and the end of power supply to the card.

Preferably, the invention provides for an enrolment algorithm or programme that requires the same finger to be placed on the device only a few times (about 4 to 6) in a single session. The programme therefore provides for one and the same finger to be placed on the device in one go, for example within the space of a few minutes (notably less than 3 or 5 minutes) from the start of storage. In the event of an interruption, whether accidental or not, during this period (disconnection of the card, finger placed on the device an insufficient number of times within a predetermined period), the invention may preferably provide for the storage of 4 to 6 fingerprints to be resumed from the beginning.

For example, current smart card fingerprint sensors are not large enough to capture the necessary fingerprint area. The acquisition of several fingerprints that complement one other, thereby covering as large an area as possible, is therefore required (FIG. 7).

Thus, as an example, FIG. 7 illustrates an acquisition of 7 fingerprints that are juxtaposed (or assembled/combined) in the device memory to portray a reference fingerprint (covering a sufficiently large area having regard to a predetermined threshold).

The invention preferably comprises, and is known to comprise, an algorithm for assembling and reconstructing fingerprint patterns up to a predefined rate. We do not rule out having a single pattern (or even two) captured and activated to implement the invention.

The invention then permits the pattern acquisition to be validated (or activated or locked or finalised) securely and transparently for users through a subsequent session of exchange of information with the device. The session including any authentication whatsoever (PIN, fingerprint, other form of authentication).

Preferably, the session for validating the acquisition of patterns and therefore for finalising the enrolment takes place during a second session of exchange (or communication) of data with the device (different to the first), this second session being related to a standardised transaction or a transaction implementing a transaction service (transport, payment, access, authentication . . . ).

In the example, the finalisation is done during an EMV type banking transaction.

In other words, the invention comprises a step of acquisition (single or multiple) of biometric data during a first acquisition/storage session and a second step of locking during a second exchange session (different to the first). The second session may preferably include user authentication.

To ensure that this takes place in hidden time or is transparent for users, it is preferable for an authentication to be done that is useful for a purpose other than enrolment. The authentication is useful, for example, when it is done in order to perform an electronic transaction with the device and to make good use of the result of the authentication for the validation or finalisation of the enrolment (or activation of the acquired biometric data).

As far as concerns the finalisation, the invention makes it possible, through a phase involving fingerprint acquisition and comparison with the fingerprints stored, to ensure that the finalisation is definitely done with the same user. Indeed, the patterns are only activated if the result of the comparison is positive (biometric authentication).

Alternatively, activation can be done with PIN code authentication. Authentication can also be done during a useful electronic transaction operation.

Alternatively, in the preferred embodiment, dual authentication is used for activation/finalisation. Authentication can be done, in particular in the example, by biometric fingerprint and by PIN code.

Biometric fingerprint authentication permits a link to be established between two different (discontinuous) exchange sessions that may have taken place at separate periods of time (hours, days) or been separated by space (different places, at home and at a bank branch) or even [with separate]

control. Authentication ensures that the user who did the acquisition is the same user as the one doing the locking.

The lock uses a dual-factor authentication plus an additional successful PIN authentication.

The invention uses, advantageously, a dual authentication with the future means of authentication (fingerprint) and the current one (PIN), which will cease to be necessary.

The invention, advantageously, adds a P26 software agent (application programme) "BioManager" enrolment manager. This programme is in this case positioned on the SE security element 4 (for example, between the transaction application and the biometric data manager) containing the electronic transaction application. The P26 "Biomanager" manager is responsible for receiving (or detecting or intercepting or controlling) the information for biometric authentication (and/or for authentication done in some other way, for example in this case by PIN).

The successful biometric authentication notification from the MCU (for example, minutiae manager) and/or other authentication (for example, by PIN) from the transaction application P20 is received by the P26 "BioManager" enrolment manager. This triggers the locking or activation of the biometric data (in this case via the P21 biometric data enrolment manager).

The P26 BioManager enrolment manager also has the function of receiving/detecting information about the absence of enrolled biometric data stored by the MCU and in response informing the P20 transaction application to continue the transaction in the usual way, in this case with PIN code authentication.

The "Biomanager" enrolment manager also has the function of receiving information on the presence of stored but not activated biometric data, in particular from the MCU, and in response informing the P20 transaction application to continue the transaction in the usual way here with an authentication with PIN code since the enrolment is not finalised (biometric data not activated).

The P26 "Biomanager" enrolment manager also has the function (in particular in the example following the implementation of the above function) of receiving/detecting successful biometric authentication information and/or successful PIN code authentication information from the transaction application and in response activating the biometric data not yet activated.

The invention claimed is:

1. A method for enrolling a holder of a biometric transaction device comprising a microcontroller, sensor, processor and memory, the method comprising:
   receiving, by the processor, power from a portable mobile power supply connector;
   storing, by the processor, a plurality of biometric patterns in the memory;
   generating, by the processor, a reference biometric template of the holder from the plurality of biometric patterns;
   initiating, by the processor, a financial transaction with a POS;
   based on the initiating, capturing, by the sensor, biometric data;
   sending, by the processor, a request comprising the captured biometric data to the microcontroller;
   determining, by the microcontroller, that the captured biometric data is not present in the memory by comparing the captured biometric data to the reference biometric template data;
   sending, by the microcontroller, a response to the processor;
   receiving, by the processor, the response and activating, by the processor, the captured biometric based on the received response; and
   executing, by the processor, the financial transaction, using the activated biometric data.

2. The method of claim 1, wherein receiving, by the processor, power from the portable mobile power supply connector includes detecting a cold power-up.

3. A device for enrolling a holder of the device, the device comprising:
   a microcontroller;
   a sensor;
   a processor; and
   a memory storing executable instructions that when executed by the processor causes the processor to perform the steps of:
   storing a plurality of biometric patterns in the memory;
   generating a reference biometric template of the holder from the plurality of biometric patterns;
   initiating a financial transaction with a POS;
   based on initiating, capturing via the sensor biometric data;
   sending a request comprising the captured biometric data to the microcontroller;
   determining via the microcontroller that the captured biometric data is not present in the memory by comparing the captured biometric data to the reference biometric template data;
   sending via the microcontroller a response;
   receiving the response and activating the captured biometric data based on the received response; and
   executing the financial transaction, using the activated biometric data.

4. The device of claim 3, wherein the storing of the plurality of biometric patterns is in response to the receiving of power from a portable mobile power supply connector.

5. The device of claim 4,
   further comprising the portable mobile power supply connector, wherein receiving, by the processor, power from a portable mobile power supply connector includes detecting a cold power-up.

* * * * *